United States Patent [19]
Hursey

[11] 3,961,159
[45] June 1, 1976

[54] LIGHT SHIELD/SUPPORT DEVICE

[76] Inventor: Martin E. Hursey, 5 Pimlico Road, Greenville, S.C. 29601

[22] Filed: June 5, 1975

[21] Appl. No.: 584,064

[52] U.S. Cl. ............................ 235/1 D; 235/61 R; D26/5 C
[51] Int. Cl.² ....................................... G06C 29/00
[58] Field of Search ........ 235/1 D, 1 R, 1 A, 145 R; 58/50, 53; D26/5 C

[56] References Cited
UNITED STATES PATENTS

| | | | |
|---|---|---|---|
| 3,531,178 | 9/1970 | Wirth | 350/284 |
| 3,887,791 | 6/1975 | Kitchens | 235/1 D |
| D228,784 | 10/1973 | Kitai | D26/5 C |
| D234,773 | 4/1975 | Herr | D26/5 C |
| D235,452 | 6/1975 | Ikeda | D26/5 C |
| D235,879 | 7/1975 | Kitai | D26/5 C |
| D235,880 | 7/1975 | Toshida | D26/5 C |

*Primary Examiner*—L. T. Hix
*Assistant Examiner*—Vit W. Miska
*Attorney, Agent, or Firm*—Bailey & Dority

[57] ABSTRACT

This invention relates to a light shield/support device for reducing glare on the lighted display window of a portable electronic calculator. The device may also be interchangeably utilized to support the calculator in an inclined position which also tends to reduce the glare on the display window as well as making operation of the keyboard and positioning of the calculator on a disk top more convenient. The device includes a pair of spaced shank members having inclined upper ends having an inclined flange member carried therebetween. Attachment means are carried by a lower end of the shank members for engaging opposing side walls for securing the device to the calculator. The shank members are of sufficient length to support the flange member above and across the display window or below and across the bottom of the calculator for selectively utilizing the device as a light shield or as a support.

10 Claims, 5 Drawing Figures

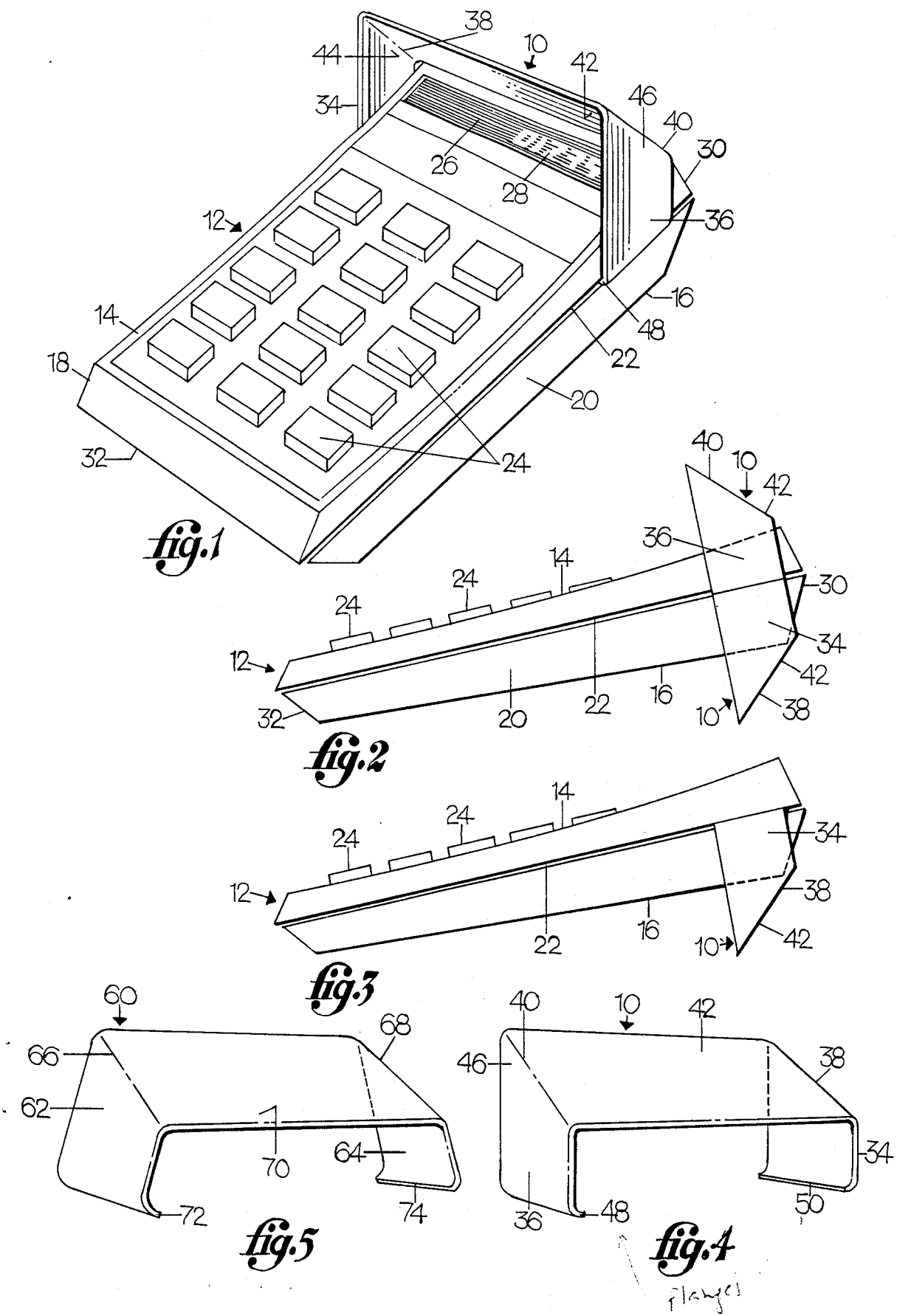

LIGHT SHIELD/SUPPORT DEVICE

BACKGROUND OF THE INVENTION

Portable numerical electronic calculators have become increasingly popular over the recent years, and particularly the pocket size type. Much use has been made of pocket calculators on desk tops as well as portable use in the field such as by structural engineers and surveyors.

One problem with such use, however, is that above flourescent interior lighting in offices, when used on a desk top, often creates a glare on the display window of the calculator which makes reading the lighted numbers displayed thereon difficult to read, sometimes leading to inaccurate reading and erroneous calculations. This problem of glare is also present when the calculator is used outside in the sun when working in the field.

It has also been found in desk use that the keyboard and display window are inconvenient to use unless the small calculator is positioned on the desk almost immediately below the eye and arm of the user. Such required positioning for prolonged periods often results in a cramped condition of the user, physically and mentally, and does not allow for spreading out the work area over the desk so that the small pocket type calculator can be positioned a comfortable distance away.

The light shield/support device of the present invention may be utilized interchangeably to reduce the glare on the display window or support the calculator in an inclined position enhancing the readability of the lighted numbers while also making the keyboard more convenient to use in the latter case.

SUMMARY OF THE INVENTION

A light shield/support device is provided for a portable numerical calculator having a housing defined by vertically spaced upper and lower surfaces joined by spaced opposed sidewalls, a plurality of numbered and operational keys carried on the upper surface, and a display window located on the upper surface for displaying lighted numbers thereon. The device comprises a pair of spaced shank members having inclined upper ends and straight lower ends and; an inclined flange member carried between the upper ends of the shank members. Attachment means are carried by the lower ends of the shank members for engaging the spaced opposed sidewalls for securing the shield and support device to the calculator. The shank members are of sufficient length to support the flange member above and across the upper surface or below and across the lower surface of the housing for selectively utilizing the device as a light shield to reduce the glare on the lighted display window from oncoming light or as a support to position the calculator in an inclined position. Thus, the device may be effectively utilized to enhance the readability of the lighted numbers on the display window, as well as support the calculator in an inclined position to make the operation of the keys and positioning of the calculator on a desk more conveniently while also reducing glare.

Accordingly, an important object of the present invention is to provide a light shield for reducing the glare on the display window of a portable calculator enhancing the readability of the numbers displayed thereon.

Another important object of the present invention is to provide a light shield/support device which can be interchangeably utilized on a portable electronic calculator positioned above and across a display window for reducing the glare thereon or positioned below and across a bottom of the calculator for supporting the calculator in an inclined position tending to reduce the glare on the display window while making the operation of the keyboard and positioning of the calculator more convenient when used on a desk top.

Another important object of the present invention is to provide a light shield/support device which can be easily attached to a portable electronic calculator and which may be adjustably positioned thereon so as to give maximum glare reduction.

Another important object of the present invention is to provide a light shield/support device which can be utilized on a portable electronic calculator which is simple and compact in construction and which is readily affordable to users thereof.

Still another important object of the present invention is to provide a light shield/support device which can be interchangeably utilized as a light shield for reducing glare on the display window of the calculator or as a support for positioning the calculator in a tilted position so as to enhance the readability of the lighted numbers used by carrying out numerical calculations thus increasing the accuracy of the calculations.

BRIEF DESCRIPTION OF THE DRAWING

The construction designed to carry out the invention will be hereinafter described, together with other features thereof.

The invention will be more readily understood, from a reading of the following specification and by reference to the accompanying drawing forming a part thereof, wherein an example of the invention is shown and wherein:

FIG. 1 is a perspective view illustrating a light shield/support device constructed in accordance with the present invention as positioned above and across the lighted display window of the calculator for reducing the glare thereon, FIG. 2 is a side elevational view illustrating the light shield/support device constructed in accordance with the present invention as used both as a light shield and as a support device for positioning the calculator in an inclined position, FIG. 3 is a side elevational view illustrating the light shield/support device constructed in accordance with the present invention as utilized as a support device for positioning the calculator in an inclined position, FIG. 4 is a rear perspective view of the light shield/support device as constructed in accordance with the present invention, and FIG. 5 is a rear perspective view illustrating an alternate embodiment of a light shield/support apparatus constructed in accordance with the present invention.

DESCRIPTION OF THE PREFERRED EMBODIMENT

The light shield/support device of the present invention may be used on any conventional portable electronic calculator, preferably of the pocket type.

Referring to FIG. 1, a light shield/support device, shown generally at 10, is illustrated as carried on a conventional portable calculator, shown generally at 12, having a housing defined by an upper surface 14 vertically spaced above a lower surface 16 joined by spaced opposed sidewalls 18 and 20. In many conventional portable calculators a longitudinal groove 22 is formed in each of the side walls 20 and 18 where the upper surface 14, lower surface 16, and the opposed side walls 18 and 20 are joined as substantially half-sections. The groove 22 usually extends around the entire periphery of the calculator housing. A plurality of numbered and operational keys 24 are carried on the upper surface 14. A display window 26 is located on the upper surface 14 for displaying lighted numbers 28 thereon produced as a result of carrying out numerical calculations on the keys of the calculator. The calculator housing is completed by end walls 30 and 32.

The light shield/support device 10 includes a pair of spaced shank members 34 and 36 having inclined upper ends 38 and 40, respectively. An inclined flange member 42 extends between the upper inclined ends 38 and 40, and defines a hood member together with upper portions 44 and 46 of shank members 34 and 36, respectively, extending above the upper surface 14 of the housing for shielding the display window 26 from oncoming light.

Attachment means are carried adjacent lower ends of the shank members 34 and 36 and include an inwardly extending flange 48 formed on the lower end of shank member 36 and an inwardly extending flange 50 formed on the lower end of shank member 34 which extend inwardly toward the spaced opposed side walls 18 and 20 when received thereover. The flanges 48 and 50 are slideably received in the longitudinal groove 22 formed along the length of each side wall 18 and 20 so as to be adjustably positionable over the display window 26 to provide the maximum glare reduction from oncoming light.

The shank members 34 and 36 are of sufficient length to extend past the lower edge of the inclined flange member 42 when attached to the calculator sides so as to support the flange member 42 above and across the upper surface 14 or below and across the lower surface 16 of the calculator housing for selectively utilizing the light shield/support device as a light shield to reduce glare or as a support to position the calculator in an inclined position. The flange member 42 is preferably inclined at an angle of 45° to the horizontal. Such an inclination results in the flange member 42 providing optimum glare reduction of the display window 26 while still permitting easy viewing and reading of the lighted members 28 displayed thereon. The flange member 42, the shank members 34 and 36, and the inwardly extending flanges 48 and 50 are preferably formed as one piece from any suitable material such as aluminum.

FIG. 5 shows an alternate embodiment of a light shield and support device shown generally at 60 having a pair of opposed shank members 62 and 64 which extend outwardly and downwardly from upper inclined ends 66 and 68, respectively. Extending between the inclined ends 66 and 68 is an inclined flange member 70 similar to the inclined flange member 42 of device 10 but somewhat shorter in length. The shank members 62 and 64 have downwardly and inwardly extending flange portions 72 and 74, respectively, adjacent lower ends thereof. This construction enables the shank members 62 and 64 to function substantially as spring clips which may be received over the sides of various shaped portable calculators providing a more universal attachment means for a light shield/support device.

In use, the light shield/support device is secured over the display window 26 by inserting the inwardly extending flanges 48 and 50 into the longitudinal groove 22 and positioning the device 10 in the desired place over the display window so as to provide maximum glare reduction. The advantageous construction of the light shield/support device allows the device to also be attached to the calculator by fitting the flanges 48 and 50 into the longitudinal groove 22 with the inclined flange 42 extending below and across the lower surface 16 of the calculator to position the calculator in an inclined position as best seen in FIGS. 2 and 3. With this device 10 utilized as a support device, the calculator is raised to a position which allows the keyboard to be more conveniently viewed and operated from a distance rather than by having to place the calculator more closely adjacent the eyes of the operator. Raising the calculator to an inclined position also tends to reduce the glare on the display window 26 coming from overhead lighting. Thus, the particular positioning of the device 10 as a light shield or as a support depends upon the preference of the operator as to which positioning will provide the best readability of the lighted numbers while also affording convenient operation of the keys 24.

It is also possible owing to the construction of the flanges 48 and 50 that a pair of devices 10 may be utilized such as shown in FIG. 2 to both shield the display windows 26 from oncoming light as well as supporting the calculator in an inclined position. This utilization of the light shield/support device 10 provides the most in glare reduction on the display window 26 while also making the operation of the keys 24 and positioning of the calculator on a desk more convenient. Of course, when utilizing a pair of devices 10 it is also possible to adjust the positioning of either device in the longitudinal grooves 22 to the user's preference to give the best glare reduction and convenience of use.

Thus, it can be seen that not only is an efficient light shield provided by the device of the present invention to reduce the glare on the display window on the portable calculator, but an interchangeable light shield and support device can be had with the advantageous construction in accordance with the present invention. The light shield/support device of the present invention provides an invaluable aid to the user of the calculator in being able to operate the keys more conveniently, place the calculator at a more comfortable distance from the user, and read the numbers more easily and accurately on the display window. Thus, the likelihood of inaccurately read numbers is reduced resulting in more error-free calculations. The light shield/support device in reducing the glare on the display window 26 reduces eye strain on the user when the calculator is used much of the time during the work day.

For purposes of illustration only, in one embodiment the dimensions of the light shield/support device 10 are as follows: length of inclined flange 42 — three and one-eighth inches; distance from lower end of shank member 34 or 36 to lower edge of flange 42 — nine-sixteenths of an inch; distance from lower end of shank member 34 or 36 to upper edge of flange 42 — one and one quarter inches; flanges 48 and 50 — one-sixteenth of an inch; and width of shank member 34 or 36 - three quarters of an inch, with shank members 34 and 36 substantially parallel.

While a preferred embodiment of the invention has been described using specific terms, such description is for illustrative purposes only, and it is to be understood that changes and variations may be made without departing from the spirit or scope of the following claims.

What is claimed is:

1. A light shield device for reducing glare on the display window of a portable numerical calculator having a housing defined by vertically spaced upper and lower surfaces joined by spaced opposed upright sidewalls, a plurality of numbered and operational keys carried on said upper surface, said display window located on said upper surface for displaying lighted numbers produced by carrying out numerical operations with said keys, said light shield comprising:

a pair of spaced shank members;

attachment means including an inwardly extending flange carried adjacent a lower portion of each said shank member for being received over the exterior surface of said spaced opposed sidewalls of said housing for removably securing said shank members to said exterior surface of said sidewalls; and an upper hood member integral with said shank members extending substantially above and across said display window for shielding said window and the lighted numbers displayed there from oncoming light effectively reducing the glare thereon so that the lighted numbers are more easily and accurately readable.

2. The device of claim 1 wherein said shank member includes a pair of spaced shank members receivable over a pair of said spaced, opposed sidewalls; said shank member having inclined upper ends.

3. The device of claim 2 wherein said flanges are slideably received in a longitudinal groove formed along the exterior surface of said sidewalls so as to be adjustably positionable over said display window on said upper surface.

4. The device of claim 2 wherein said hood member includes an inclined flange member carried between said upper ends of said shank member.

5. The device of claim 4 wherein said flange member is inclined at an angle of approximately forty-five degrees.

6. The device of claim 4 wherein said hood member is defined by said inclined flange member and upper side portions of said shank members extending above said upper surface.

7. The device of claim 3 wherein said shank members, said hood member, and said inwardly extending flanges are formed as one piece.

8. The device of claim 2 wherein said attachment means includes an outwardly and downwardly extending portion of said shank member terminating in an inwardly and downwardly extending flange; said portion of each of said spaced shank members being received over the opposed sidewalls of said housing in a slightly spread-apart configuration to provide a spring clip attachment thereto.

9. A light shield/support device for a portable numerical calculator having a housing defined by vertically spaced upper and lower surfaces joined by spaced opposed sidewalls, a plurality of numbered and operational keys carried on said upper surface, a display window located on said upper surface for displaying lighted numbers thereon, said device comprising:

a pair of spaced shank members having inclined upper ends and substantially level lower ends;

an inclined flange member carried between said upper ends of said shank members;

attachment means carried by said lower ends of said shank members for engaging said spaced opposed sidewalls for securing said shield and support device to said calculator; and said shank members being of sufficient length to support said flange member above and across said upper surface or below and across said lower surface of said housing for selectively utilizing said device as a light shield to reduce the glare on said lighted display window from oncoming light or as a support to position said calculator in an inclined position;

whereby said device may be utilized to effectively enhance the readability of said lighted numbers on the display window.

10. The device of claim 9 wherein said attachment means includes a flange formed on a lower end of each of said shank members extending inwardly toward said spaced opposed sidewalls when received thereover; said flanges slideably received in a longitudinal groove formed in said sidewalls so as to be adjustably positionable over the length thereof.

* * * * *